(12) United States Patent
Partyka et al.

(10) Patent No.: US 10,822,979 B2
(45) Date of Patent: Nov. 3, 2020

(54) CURVIC SEAL FOR GAS TURBINE ENGINE

(71) Applicant: UNITED TECHNOLOGIES CORPORATION, Hartford, CT (US)

(72) Inventors: Julian Partyka, West Springfield, MA (US); Scott D Virkler, Ellington, CT (US); Jonathan P Sandoval, Hebron, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1252 days.

(21) Appl. No.: 14/774,308

(22) PCT Filed: Mar. 14, 2014

(86) PCT No.: PCT/US2014/027002
§ 371 (c)(1),
(2) Date: Sep. 10, 2015

(87) PCT Pub. No.: WO2014/197074
PCT Pub. Date: Dec. 11, 2014

(65) Prior Publication Data
US 2017/0191369 A1 Jul. 6, 2017

Related U.S. Application Data

(60) Provisional application No. 61/784,063, filed on Mar. 14, 2013.

(51) Int. Cl.
*F01D 11/00* (2006.01)
*F01D 5/02* (2006.01)
*F04D 29/08* (2006.01)

(52) U.S. Cl.
CPC ............ *F01D 11/003* (2013.01); *F01D 5/026* (2013.01); *F01D 11/005* (2013.01); *F04D 29/083* (2013.01); *F05D 2220/32* (2013.01); *F05D 2240/55* (2013.01); *F05D 2240/61* (2013.01); *F05D 2250/75* (2013.01); *F05D 2260/36* (2013.01); *F05D 2300/10* (2013.01); *Y02T 50/671* (2013.01)

(58) Field of Classification Search
CPC ............................. F01D 11/003; F04D 29/083
See application file for complete search history.

(56) References Cited

U.S. PATENT DOCUMENTS

| | | |
|---|---|---|
| 4,767,276 A | 8/1988 | Barnes et al. |
| 5,628,621 A | 5/1997 | Toborg |
| 5,639,212 A | 6/1997 | Schaefer et al. |
| 6,076,835 A | 6/2000 | Ress et al. |
| 2006/0045745 A1* | 3/2006 | Synnott ................. F01D 11/003 416/219 R |
| 2008/0053107 A1 | 3/2008 | Weaver et al. |
| 2011/0033283 A1* | 2/2011 | Chrzastek ............. F01D 5/3007 415/174.2 |
| 2011/0103949 A1* | 5/2011 | Pakkala ................ F04D 29/522 415/231 |
| 2014/0241874 A1* | 8/2014 | Rioux ................... F01D 25/246 415/209.4 |
| 2015/0226130 A1* | 8/2015 | Salamon ................... F02C 7/28 60/772 |

(Continued)

Primary Examiner — James M Hewitt, II
(74) Attorney, Agent, or Firm — Bachman & LaPointe, P.C.

(57) ABSTRACT

A curvic seal for a gas turbine engine includes a cylindrical seal with a retention feature.

1 Claim, 3 Drawing Sheets

(56) References Cited

U.S. PATENT DOCUMENTS

2016/0010458 A1* 1/2016 Virkler .................. F01D 5/026
                                                                                           416/120
2016/0017738 A1* 1/2016 Rogers .................... F02C 7/28
                                                                                         415/214.1

* cited by examiner

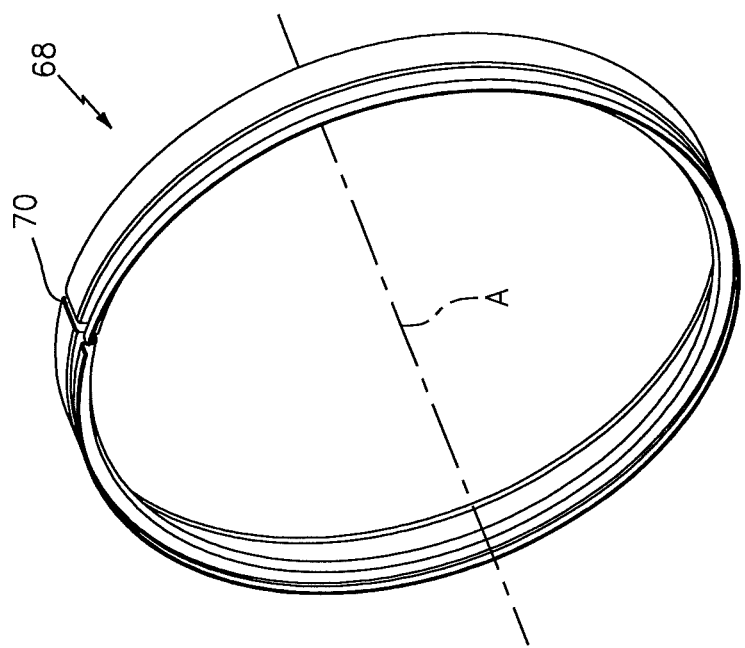
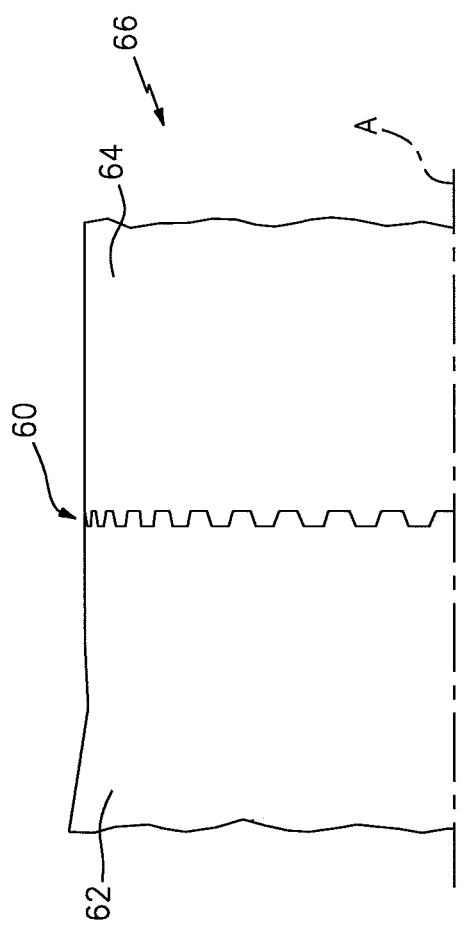
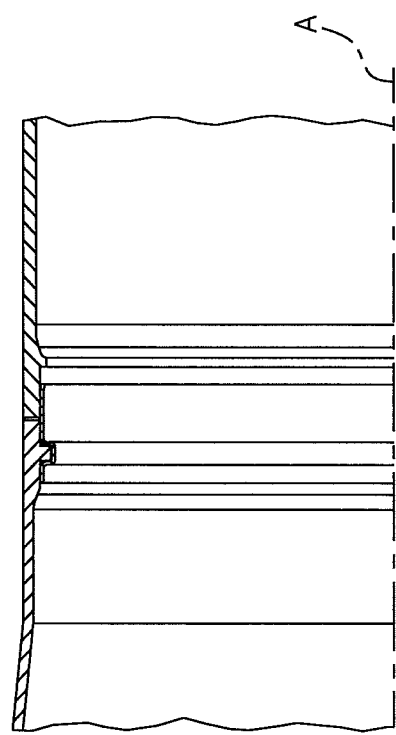
FIG. 4
FIG. 2
FIG. 5 the gear reduction ratio is greater than about 2.5:1. The geared architecture 48 may be an epicyclic gear train, such as a planetary gear system or other gear system, with a gear reduction ratio of greater than about 2.3:1.

CURVIC SEAL FOR GAS TURBINE ENGINE

This application claims priority to U.S. Patent Appln. No. 61/784,063 filed Mar. 14, 2013.

BACKGROUND

The present disclosure relates to a gas turbine engine and, more particularly, to a coupling mechanism for rotational elements.

A curvic coupling is a self-centering joint that transfers torque between rotatable elements. The curvic coupling provides an accurate, light, compact, and self-contained connection in which curvic teeth operate as centering and driving devices. The most widely used type of curvic coupling for gas turbine engines is the fixed curvic coupling. Many turboprop, turboshaft and turbofan engines include examples of this application in which disk-like rotatable elements of a rotational group are mounted together with fixed curvic coupling teeth. Curvic couplings, however, may not be air tight and are often sealed by a curvic seal.

SUMMARY

A curvic seal for a gas turbine engine according to one disclosed non-limiting embodiment of the present disclosure includes a cylindrical seal with an axial retention feature.

In a further embodiment of the present disclosure, the axial retention feature is U-shaped.

In a further embodiment of any of the foregoing embodiments of the present disclosure, the cylindrical seal is a split-ring sheet metal seal.

A further embodiment of any of the foregoing embodiments of the present disclosure includes a rolled flange on an aft edge section of the cylindrical seal.

A curvic joint assembly for a gas turbine engine according to another disclosed non-limiting embodiment of the present disclosure includes a curvic coupling between a first component and a second component along an axis and a curvic seal within an interior of the first component and the second component with respect to the axis to seal the curvic coupling, the curvic seal includes an axial retention feature that interfaces with the first component.

In a further embodiment of any of the foregoing embodiments of the present disclosure, the axial retention feature is U-shaped.

In a further embodiment of any of the foregoing embodiments of the present disclosure, the axial retention feature interfaces with an inner rim that extends from an inner surface of the first component.

In a further embodiment of any of the foregoing embodiments of the present disclosure, the first component and the second component are cylindrical.

In a further embodiment of any of the foregoing embodiments of the present disclosure, the curvic seal is a split-ring sheet metal seal.

A further embodiment of any of the foregoing embodiments of the present disclosure includes a rolled flange on an aft edge section of the curvic seal.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is a schematic partial outer view of a curvic coupling;

FIG. 4 is a perspective view of a curvic seal for the curvic coupling; and

FIG. 5 is a schematic partial inner view of the curvic coupling.

DETAILED DESCRIPTION

Figure 1:
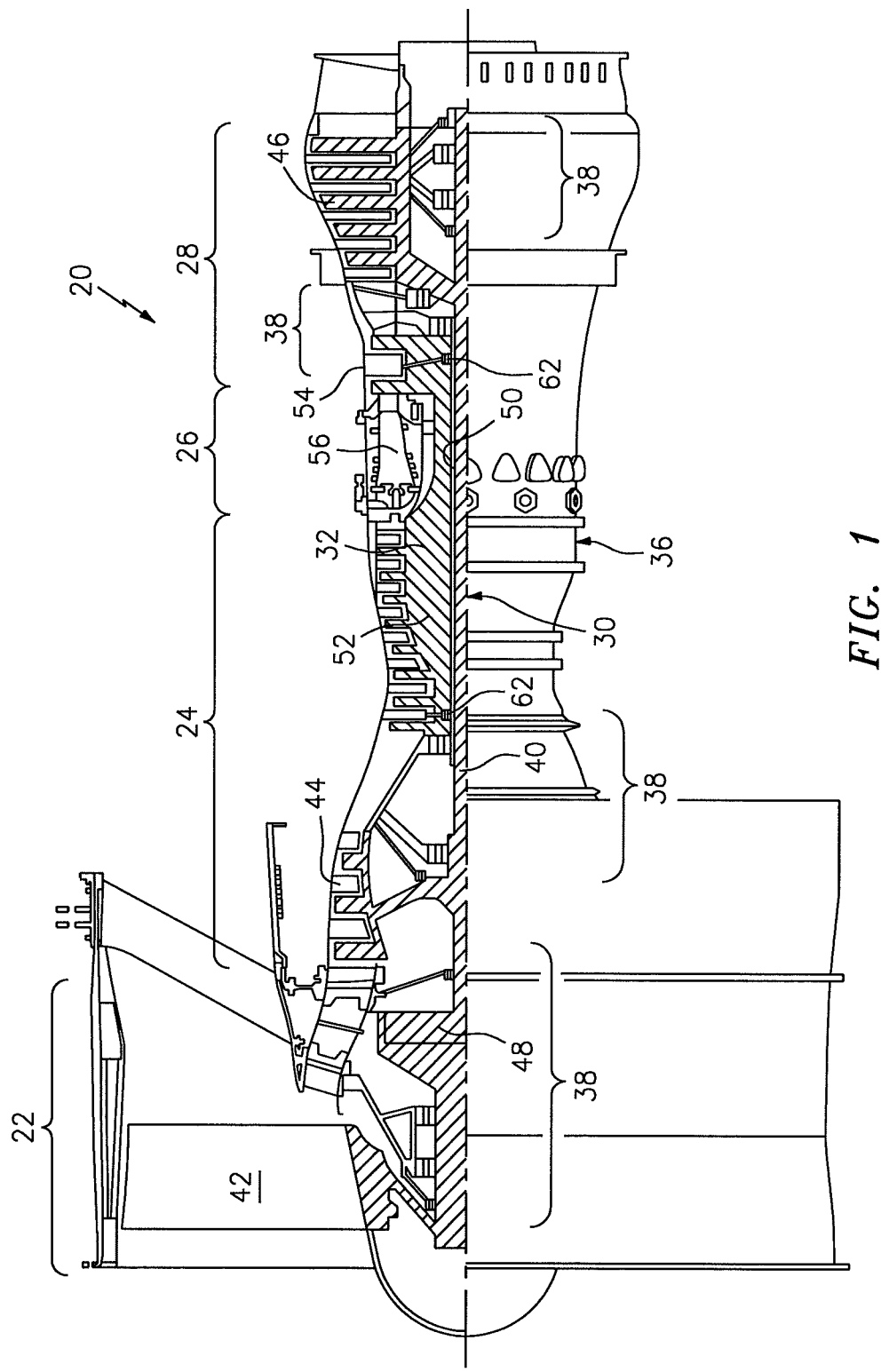
FIG. 1 is a schematic cross-section of one example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, industrial gas turbines, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be appreciated that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

With reference to FIG. 2, a curvic coupling 60 is located between a first component 62 and a second component 64 of an assembly 66 such as in the high spool 32 between the high pressure compressor 52 ("HPC") and the high pressure turbine 54 ("HPT") which may be a blind module assembly location. The first component 62 and the second component 64 may be defined along axis A.

Figure 3:
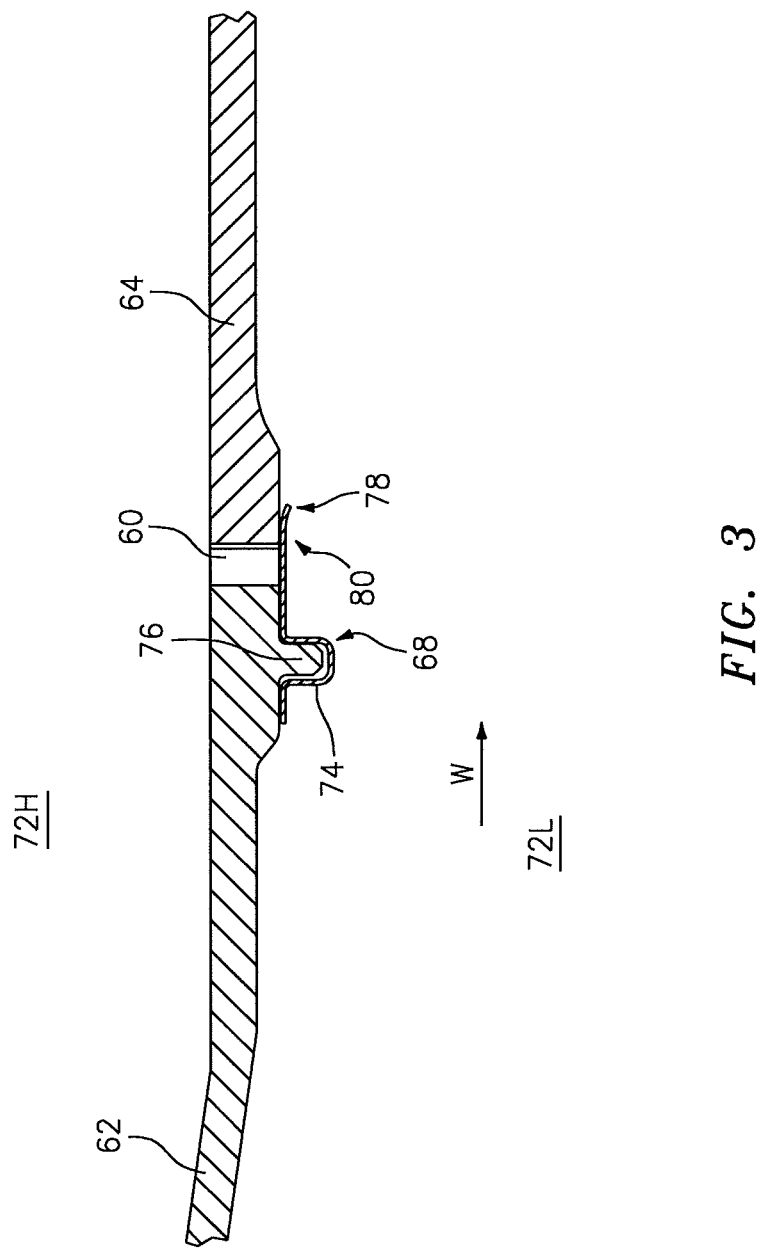
FIG. 3 is a cross-sectional view of the curvic coupling.

With reference to FIG. 3, a curvic seal 68 is located over the curvic coupling 60 between the first component 62 and the second component 64. The curvic seal 68, in one disclosed non-limiting embodiment, is a split-ring sheet metal seal (FIG. 4) that mechanically loads on an inner diameter of the curvic coupling 60 (also shown in FIG. 5). That is, the curvic seal 68 is generally cylindrical with a slot 70 (FIG. 4). The magnitude of the mechanical loading is sufficient to overcome a pressure drop across the curvic coupling 60 between a high pressure area 72H and a low pressure area 72L.

With continued reference to FIG. 3, the curvic seal 68 includes a retention feature 74 that interfaces with an inner rim 76 on the first component 62 to provide axial retention. The retention feature 74 in one disclosed non-limiting embodiment is a U-shaped bend. The curvic seal 68 is thereby axially locked to the first component 62 to facilitate blind module assembly. A rolled flange 78 on an aft edge section 80 of the curvic seal 68 further facilitates blind module assembly. That is, the rolled flange 78 provides an effective interface as the first component 62 is axially assembled to the second component 64 as illustrated schematically by arrow W.

The curvic seal 68 is light-weight, requires no pre-load, is axially locked in place and the rolled flange 78 allows for blind module assembly such as between the high pressure compressor 52 ("HPC") and the high pressure turbine 54 ("HPT") without the potential for buckling the curvic seal 68.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A curvic seal for a curvic coupling that transfers torque between a first component and a second component along an engine central longitudinal axis of a gas turbine engine comprising:
   a cylindrical seal with a retention feature, wherein said retention feature is shaped to interface with an inner rim that extends from an inner surface of a cylindrical component such that said cylindrical seal is axially locked to said first component to facilitate blind module assembly of said first component and said second component.

* * * * *